United States Patent
One (10) Patent No.: US 9,358,862 B2
(45) Date of Patent: Jun. 7, 2016

(54) WEATHERSTRIP FOR AUTOMOTIVE VEHICLE

(71) Applicant: KINUGAWA RUBBER IND. CO., LTD., Chiba-shi, Chiba (JP)

(72) Inventor: Takeshi One, Chiba (JP)

(73) Assignee: KINUGAWA RUBBER IND. CO., LTD., Chiba-shi (JP)

( * ) Notice: Subject to any disclaimer, the term of this patent is extended or adjusted under 35 U.S.C. 154(b) by 0 days.

(21) Appl. No.: 14/254,074

(22) Filed: Apr. 16, 2014

(65) Prior Publication Data
US 2014/0311040 A1    Oct. 23, 2014

(30) Foreign Application Priority Data
Apr. 17, 2013 (JP) .................................. 2013-086216

(51) Int. Cl.
*B60J 10/00* (2016.01)
*B60J 10/08* (2006.01)

(52) U.S. Cl.
CPC ............ *B60J 10/0068* (2013.01); *B60J 10/081* (2013.01); *B60J 10/086* (2013.01)

(58) Field of Classification Search
CPC ..... B60J 10/0068; B60J 10/081; B60J 10/086
USPC ............ 49/475.1, 479.1, 484.1, 489.1, 490.1, 49/495.1, 496.1
See application file for complete search history.

(56) References Cited

U.S. PATENT DOCUMENTS

| | | | | | |
|---|---|---|---|---|---|
| 3,638,359 | A | * | 2/1972 | Kruschwitz ................. | 49/490.1 |
| 4,030,245 | A | * | 6/1977 | Yeomans ..................... | 49/490.1 |
| 4,690,412 | A | * | 9/1987 | Tuckley et al. .............. | 277/642 |
| 4,695,499 | A | * | 9/1987 | Whitener ..................... | 428/122 |
| 4,702,039 | A | * | 10/1987 | Bocchinfuso ............... | 49/490.1 |
| 4,848,035 | A | * | 7/1989 | Sakuma et al. ............. | 49/490.1 |
| 4,869,945 | A | * | 9/1989 | Harney ........................ | 428/122 |
| 5,085,006 | A | * | 2/1992 | Hayashi et al. ............. | 49/482.1 |
| 5,305,553 | A | * | 4/1994 | Shimizu et al. ............. | 49/490.1 |
| 7,069,697 | B2 | * | 7/2006 | Hamada et al. ................. | 49/428 |
| 7,698,856 | B2 | * | 4/2010 | Tamaoki et al. ................ | 49/441 |
| 8,595,982 | B2 | * | 12/2013 | Matsuura et al. ............... | 49/441 |
| 8,646,214 | B2 | * | 2/2014 | Otsuka et al. ............... | 49/490.1 |
| 2008/0000165 | A1 | * | 1/2008 | Ochiai ........................ | 49/490.1 |
| 2008/0148646 | A1 | * | 6/2008 | Nozaki et al. ............... | 49/490.1 |

FOREIGN PATENT DOCUMENTS

| | | | | |
|---|---|---|---|---|
| DE | 10131928 A1 | * | 1/2002 | |
| FR | 2572694 A1 | * | 5/1986 | ............... B60J 10/00 |
| GB | 2006309 B | * | 3/1982 | |
| GB | 2178466 A | * | 2/1987 | ............... E06B 7/23 |
| JP | 2005-047448 A | | 2/2005 | |

* cited by examiner

Primary Examiner — Katherine Mitchell
Assistant Examiner — Marcus Menezes
(74) Attorney, Agent, or Firm — Foley & Lardner LLP (57) ABSTRACT

A weatherstrip includes a welt section in a substantially letter U shape cross section attached to a flange, and a trim lip formed on an outer surface of an inner side wall section to cover an end edge of a vehicular body trim. The flange is held from both sides by holding lips extending obliquely toward a summit section from the inner surfaces of the respective side wall sections. A projection section is projected on a back side of the outer holding lip. When the flange is fitted, the outer holding lip is struck on the projection section and positioned.

4 Claims, 7 Drawing Sheets

WEATHERSTRIP FOR AUTOMOTIVE VEHICLE

TECHNICAL FIELD

The present invention relates to a weatherstrip mounted on a peripheral edge section of an opening of a vehicular body side of an automotive vehicle.

BACKGROUND OF THE INVENTION

For example, a weatherstrip is mounted on an opening edge of a vehicular body side opening section opened or closed by means of a vehicular trunk in order to secure a sealing characteristic. This weatherstrip 30 includes a welt section 32 in a substantially letter U shape in cross section and fitted to a flange 31 mounted on a peripheral edge section of the vehicular body side opening section and a trim lip 34 extended from an outer surface of this welt section 32 and which covers and hides an end edge of vehicular body trim 33. This trim lip 34 causes the end edge of vehicular body trim 33 not to be exposed and an outer appearance quality is improved. Welt section 32 is provided with holding lips 35, 35 extended toward obliquely a summit section from an inner surface of the respective side wall sections mutually connected from the summit section. When these holding lips 35 are elastically contacted on flange 31, welt section 32 is held by flange 31 (for example, refer to a Patent document 1).

PRE-PUBLISHED DOCUMENT

Patent Document

[Patent document 1] Japanese patent application publication No. JP2005-47448 (FIG. 2)

DESCRIPTION OF THE INVENTION

Task to be Solved by the Invention

Since flange 31 is constituted by metallic plates properly linked together in an elongate direction (a peripheral direction along the peripheral edge of the vehicular body opening section). Hence, thicknesses in the elongate direction are made different. A positional relationship between flange 31 and vehicular body trim 33 is, in general, set so that a distance between an outer side surface and an end edge of vehicular body trim 33 is constant with the outer side surface which is remote from the vehicular body opening edge as a reference. In addition, in a conventional weatherstrip, the welt section is attached at a center of a plate thickness of the flange. Therefore, a positional relationship between vehicular body trim 33 and trim lip 34 is deviated between a part 31A of flange 31 whose plate thickness is thin as shown in FIG. 7(a) and a part 31B of flange 31 whose plate thickness is thick as shown in FIG. 7(b).

Figure 7A:
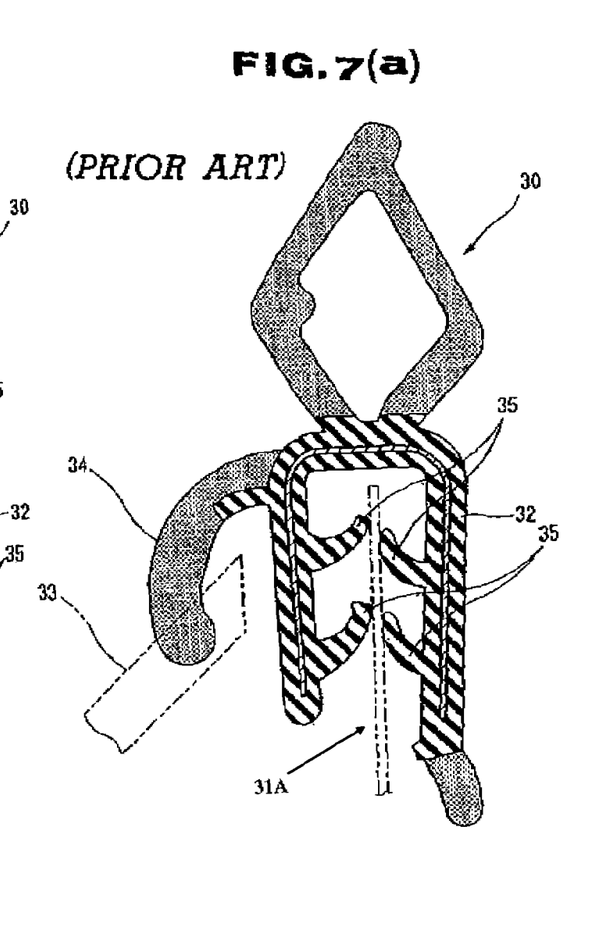
FIGS. 7(a) and 7(b) are explanatory views of a conventional weatherstrip, FIG. 7(a) representing a cross sectional view cut away along line III-III in FIG. 1 and representing a state in which the conventional weatherstrip is attached to a flange having a thin plate thickness and FIG. 7(b) representing a cross sectional view cut away along line IV-IV in FIG. 1 representing a state in which the conventional weatherstrip is attached to the flange having a thick plate thickness.
Figure 7B:
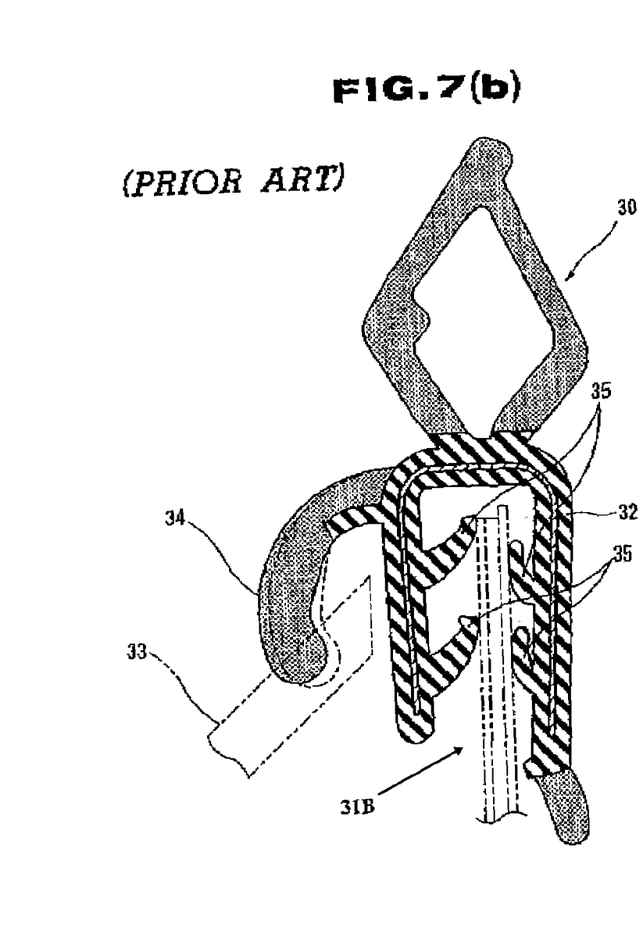

It should be noted that trim lip 34 denoted by a phantom line (dot-dot-and-dash line) in FIG. 7(b) represents the positional relationship between vehicular body trim 33 and trim lip 4 in a free state of a part 31A of flange 31 (refer to FIG. 7(a)). In this way, when the positional relationship between vehicular body trim 33 and trim lip 34 is deviated, a bending margin of trim lip 34 is increased or decreased. Especially, there is a possibility that a gap between vehicular body trim 33 and a tip of trim lip 34 is generated. In addition, since the positional relationship between vehicular body trim 33 and trim lip 34 is made different in the elongate direction, such a feeling that both of the vehicular body trim and the trim lip are waved so that there is a possibility that an outer appearance quality is decreased.

SUMMARY OF THE INVENTION

It is, with the above-described problem in mind, a main object of the present invention to provide a weatherstrip which makes an attached position of a welt section with respect to the flange, particularly the attached position of the welt section with respect to an outer side surface of the flange and improves the outer appearance quality, even if the plate thickness of the flange is uneven in the elongate direction.

To achieve the above-described main object, according to a first invention, there is provided a weatherstrip for an automotive vehicle, comprising: a welt section attached onto a flange, the flange being mounted on a peripheral edge section of a vehicular body side opening section, having a substantially letter U shape in cross section, and having a pair of side wall sections opposed against each other with the flange grasped between the pair of side wall sections and mutually connected to each other via a summit section; a trim lip formed on an outer surface of an inner side wall section of the pair of side wall sections which is nearer to the vehicular body side opening section to cover an end edge of a vehicular body trim; a holding lip extended obliquely toward the summit section from each of inner surfaces of the pair of side wall sections and which is elastically contacted on the flange to be bending deformed to have the welt section held to the flange; and a projection section projected from a back side of the holding lip in an inner surface of an outer side wall section of the pair of side wall sections which is remote from the vehicular body side opening section and contacted on the holding lip when a tip side of the holding lip is bending deformed to approach to the outer side wall section.

In a second invention, there is provided a distance between an outer side surface of the flange which is remote from the vehicular body side opening section and the end edge of the vehicular body trim is set to be constant and the welt section is positioned to the outer side surface of the flange by contacting the holding lip of the outer side wall section on the projection section.

In a third invention, there is provided a thickness of the holding lip of the inner side wall section is thicker than the thickness of the holding lip of the outer side wall section.

In a fourth invention, there is provided further comprises a hollow seal section formed on an outer surface of the summit section and elastically contacted on a peripheral edge section of an open/closing body which opens or closes the vehicular body side opening section when the open/closing body is closed.

In the above-described first invention, the projection section is projected at the back side of the holding lip in the inner surface of the outer side wall section of the side wall sections located at both sides of the welt section and the projection section is contacted on the holding lip when the tip side of the holding lip is bending deformed to approach to the outer side wall section when the weather strip is fitted to the flange.

In other words, irrespective of the thickness of the flange, the holding lip is positioned in a state in which the holding lip is struck on the projection section of the outer side wall section so that the distance between the outer side wall section and the flange is held to be constant.

Therefore, for example, as in the case of the second invention, in a case where the distance between the outer side surface of the flange at the vehicle body side and the end edge of the vehicular body trim is set to be constant, the position of the welt section with respect to the outer side surface of the flange is held at a substantially constant irrespective of the thickness of the flange and, in addition, the gap between the end edge of the vehicular body trim and the tip of the trim lip can be prevented from being generated and the outer appearance quality can be improved since the positional relationship between the end edge of the vehicular trim and the tip of the trim lip is held to be constant.

In addition, as in the case of the third invention, the thickness of holding lip of the inner side wall section is relatively thickened, this thick holding lip of the inner side wall section causes the flange to be pressed toward the direction of the outer side wall section even if the thickness of the flange is relatively thin so that the flange can positively be held in a state in which the holding lip of the outer side wall section is contacted on the projection section.

Especially, as in the case of the fourth invention, in a case where the hollow seal section is provided on the outer surface of the summit section, the hollow seal section is projected in a direction along the flange. Hence, in a case where the position of the welt section with respect to the flange is varied, the welt section is inclined with respect to the flange, a phenomenon of, so called, falling or turning around becomes easy to occur. Hence, the present invention which is capable of positioning the welt section with respect to the flange is extremely effective.

Effect of the Invention

According to the present invention, even in a case where the plate thickness of the flange is varied in the elongate direction in a state in which the holding lip causes the welt section to be stably held to the flange, the projection section makes the attachment position of the welt section with respect to the flange appropriate, the gap between the end edge of the vehicular body trim and the tip of the trim lip can be prevented from being generated and the outer appearance quality can be improved.

EMBODIMENTS FOR CARRYING OUT THE INVENTION

Figure 1:
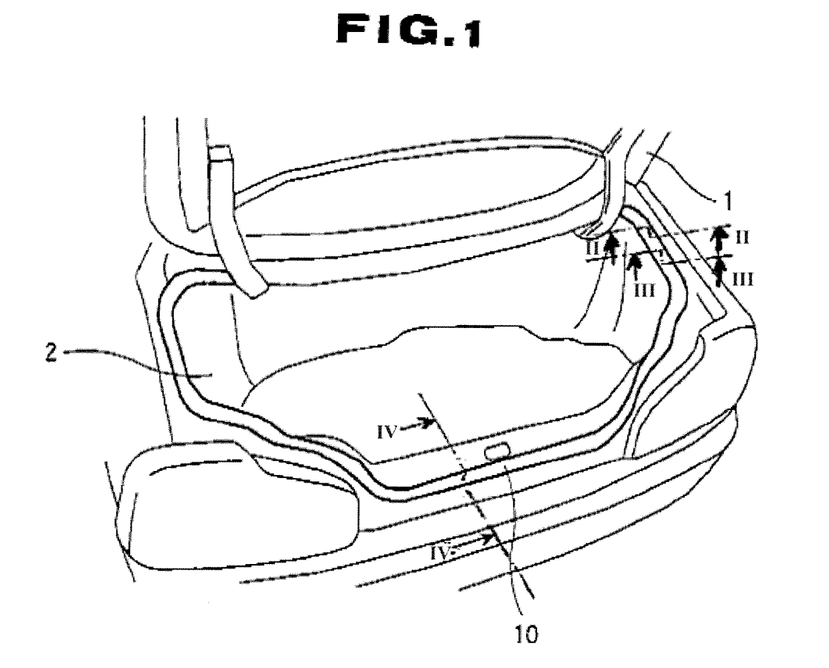
FIG. 1 is a perspective view of a trunk of an automotive vehicle on which a weatherstrip related to a first preferred embodiment according to the present invention is mounted.

Hereinafter, the present invention will be explained on a basis of preferred embodiments shown in the drawings. FIGS. 1 through 4 show a weatherstrip 10 for an automotive vehicle related to a first preferred embodiment according to the present invention. As shown in FIG. 1, elongate weatherstrip 10 is mounted in a closed loop over a whole length of a peripheral edge section of a trunk opening section 2 of a vehicle rear part at which a trunk 1 is opened or closed.

Figure 2:
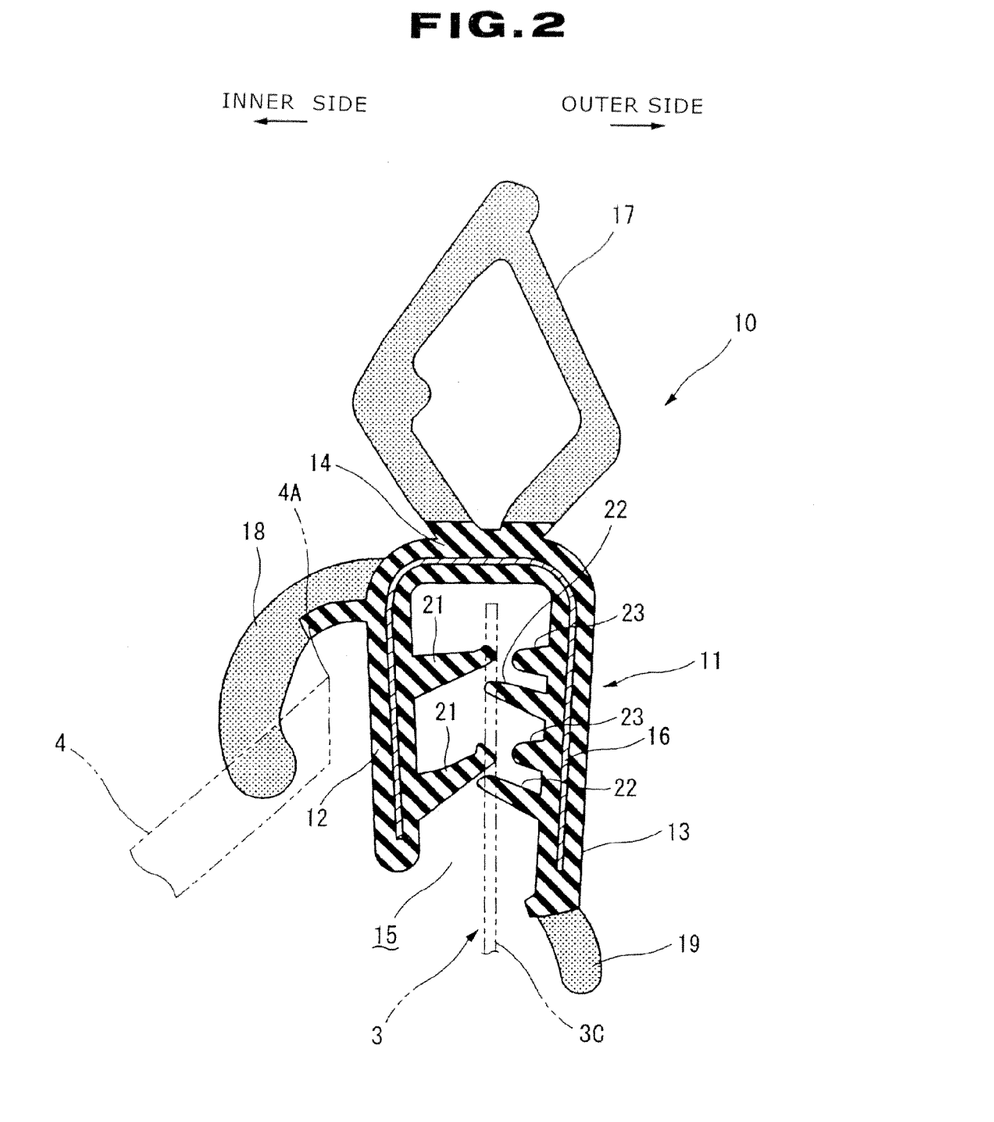
FIG. 2 is a cross sectional view representing a free length of the weatherstrip cut away along the line of II-II in FIG. 1.
Figure 3:
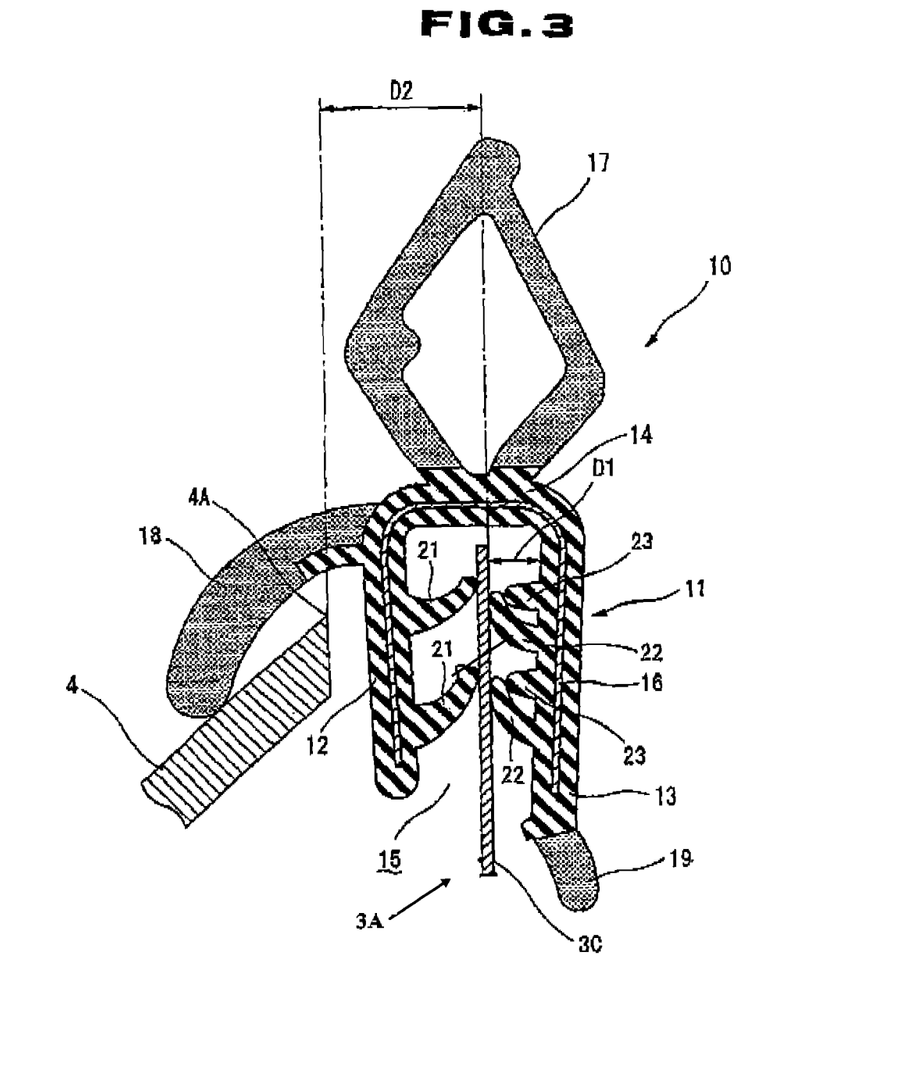
FIG. 3 is a cross sectional view cut away along a line of III-III in FIG. 1 representing a state in which the weatherstrip is attached to a flange having a thin plate thickness.
Figure 4:
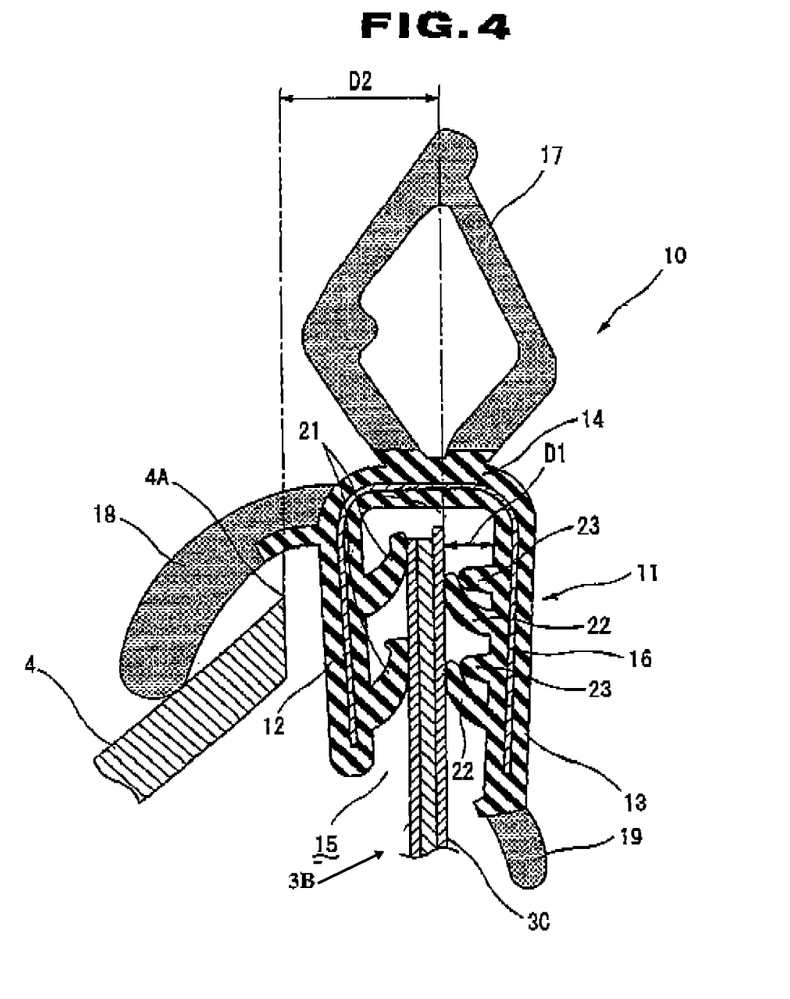
FIG. 4 is a cross sectional view cut away along a line of IV-IV in FIG. 1 representing a state in which the weatherstrip is attached to a flange having a thick plate thickness.

FIG. 2 shows a cross sectional view of the weatherstrip at a position along the line II-II of FIG. 1. In addition, FIG. 3 shows a cross sectional view of weatherstrip 10 mounted on a part 3A having a thin plate thickness of a flange 3. FIG. 4 shows a cross sectional view of weatherstrip 10 mounted on a part 3B of flange 3 having a thick plate thickness.

Flange 3 of the vehicular body side is constituted by the closed loop in which metallic plates are properly linked together in the elongate direction. Hence, as shown in FIG. 3, thickness becomes thin at part 3A of metallic plate since the metallic part is a single sheet and as shown in FIG. 4, part 3B in which a plurality of metallic plates are overlapped becomes thick. That is to say, the thicknesses of (plate thicknesses) flange 3 are made different in the elongate direction.

Weatherstrip 1 is made under an extrusion molding over a uniform cross section and has a welt section 11 in a cross section of an approximately letter U shape. This welt section 11 includes a pair of side wall sections 12, 13 mutually opposed against each other and mutually connected to each other by means of a summit section 14 interposed therebetween so as to be formed in a cross section approximately letter U shape, with a position opposite to summit section 14 as an opening section 15. Pair of side wall sections 12, 13 receives and grasps flange 3 which is a junction section of the vehicle body side. A metallic or resin made core member 16 which is analogous to welt section 11 is buried into an inner side of welt section 11.

It should be noted that, from among pair of side wall sections 12, 13, an interior side wall section 12 located at an inner side nearer to trunk opening section 2 than flange 3 is called an inner side wall section 12 and an exterior side wall section 13 located at an exterior side remote from trunk opening section 2 than flange 3 is called an outer side wall section 13.

A hollow seal section 17, a trim lip 18, and an auxiliary lip 19 are integrally formed on an outer surface side of this welt section 11. Hollow seal section 17 is additionally formed on an exterior surface of summit section 14, a substantially rhombic closed loop, and projected toward an upward direction from summit section 14 along a projection direction of flange 3. This hollow seal section 17 is elastically contacted on a rear surface side of trunk 1 (refer to FIG. 1) when the trunk is closed so that a seal characteristic to trunk 1 can be secured.

Trim lip 18 is properly bent from an proximity of summit section 14 of inner side wall section 12 and extended at a side direction. Thus, trim lip 18 is contacted on an outer surface adjacent to an end edge 4A of vehicular body trim 4 so as to cover end edge 4A of vehicular body trim 4 which is an interior member at the vehicular body side. Auxiliary lip 19 is extended toward an oblique outer direction from a tip of outer side wall section 13. This auxiliary lip 19 is elastically contacted on a vehicular body panel (not shown) so as to provide a good appearance and has a function to suppress a drop or falling down or turn around of welt section 11.

In this way, hollow seal section 17, trim lip 18, and auxiliary lip 19, these parts being elastically contacted on a party component, are formed of a relatively soft sponge rubber.

Welt section 11 to be fitted to flange 3 is formed of a relatively hard solid rubber to secure a desired holding force including holding lips 21, 22 and projection section 23, 23 which will be described later.

Holding lips 21, 22 are integrally formed on inner surfaces of respective side wall sections 12, 13 and extended obliquely toward summit section 14. Holding lips 21, 22 are two steps in a depth direction of welt section 11. These holding lips 21, 22 are elastically contacted on flange 3 and are bending deformed. Thus, welt section 11 is stably held to flange 3. Inner holding lip 21 mounted on inner side wall section 12 is formed to have a thick thickness shape as compared with outer holding lip 22 mounted on outer side wall section 13 and a length of inner holding lip 21 is set to be longer than that of outer holding lip 22.

A pair of projection sections 23, 23 for positioning purpose are projected at back sides of outer holding lips 22, 22.

Each projection section 23 is a substantially trapezoidal shape and becomes slender as it goes to its tip section. That is to say, each projection section 23 is thick and has a solid shape. Each projection section 23 has a relatively high rigidity and a relatively high reaction force as compared with each of holding lips 21, 22. On the other hand, each of holding lips 21, 22 is a substantially tongue piece shape projected obliquely toward summit section 14 and has a flexibility in accordance with its projection length.

When weatherstrip 1 thus structured is fitted and held onto flange 3 which is the other side, as shown in FIGS. 3 and 4, holding lips 21, 22 are bending deformed toward summit section 14 and welt section 11 receives flange 3 and grasps flange 3 from both sides of flange 3.

When weatherstrip 1 is fitted to flange 3, back surfaces of outer holding lips 22 are contacted on and struck against projection sections 23 while outer holding lips 22 are bending deformed. It should be noted that a bending reaction force (rigidity) of each of projection sections 23, 23 is sufficiently larger than the bending reaction force (rigidity) of each of holding lips 21, 22. Hence, flange 3 is positioned and fixed with outer holding lips 22, 22 held thereon so as to be pressed against projection sections 23. At the same time, the reaction force generated due to the bending deformation of both side holding lips 21, 22 is acted upon flange 3. In other words, flange 3 is grasped under pressure from both sides of holding lips 21, 22 due to the bending deformation of holding lips 21, 22 and positioned at a predetermined position by means of projection sections 23, 23.

In this respect, a further specific explanation will, hereinafter, be made. Since holding lips 21, 22 have low reaction force (rigidity) as compared with projection sections 23, 23, at a thick plate thickness part 3B of flange 3 as shown in FIG. 4, inner holding lips 21, 21 are largely bending deformed in a state in which outer holding lips 22, 22 are struck on projection sections 23, as compared with a thin plate thickness part 3A of flange 3 as shown in FIG. 3. In other words, in spite of the plate thickness of flange 3, a distance D1 between an outer side surface 3C which is a remote side from a trunk opening section 2 of flange 3 which is a positioning criterion and outer side wall section 13 (the inner surface side of outer side wall section 13) is substantially constant.

In addition, welt section 11 is held in a state in which welt section 11 is positioned at substantially the same position as outer side surface 3C.

It should, herein, be noted that distance D2 between vehicular body trim 4 of the vehicular body side and outer side surface 3C of flange 3 is set to be constant. Hence, the positional relationship of welt section 11 with respect to vehicular body trim 4 is held at the approximately same position in spite of the thickness of flange 3. Consequently, since a positional relationship of trim lip 18 with respect to vehicular body trim 4 is substantially constant irrespective of the plate thickness of flange 3 and a bending margin of trim lip 18 is equalized in the elongate direction, a gap between the end edge of vehicular body trim 4 and a tip of trim lip 18 can be prevented from being generated and an outer appearance of weatherstrip 1 can be improved.

It should, herein, be noted that, if outer holding lips 22 were omitted and projection sections 23 were directly struck against outer side surface 3C of flange 3, the holding force of welt section 11 with respect to flange 3 would be reduced and a drop out would be introduced in a case where an external force of a drop out direction (upward direction in FIGS. 3 and 4) is acted upon welt section 11.

Whereas, in this embodiment, four holding lips 21, 22 grasp flange 3 at both sides in a state in which four holding lips 21, 22 are bended in an opposite direction as the drop out direction of flange 3. Hence, the reaction force involved in the bending deformation of holding lips 21, 22 opposes the external force of the drop out direction so that the holding force of weatherstrip 1 to flange 3 can sufficiently be secured.

Furthermore, in weatherstrip 10 for trunk purpose in this preferred embodiment, hollow seal section 17 is disposed at an outside of summit section 14, namely, in a case of weatherstrip 10 in which hollow seal section 17 is disposed along a projection direction of flange 3, an external force is acted in a form along flange 3 when the trunk is closed. Hence, in a case where the position of welt section 11 is varied with respect to flange 3, an inclination of welt section 11 with respect to flange 3, namely, so-called, a turning around or falling would be generated.

In this respect, in this embodiment, since the position of welt section 11 with respect to outer side surface 3C which is a position criterion of flange 3 is constant, the generation of the turning around and falling can be suppressed. That is to say, the present invention is particularly effective in weatherstrip 10 in which hollow seal section 17 is disposed at the outside of summit section 14.

In addition, in the first embodiment, the thickness of inner holding lip 21 is thicker than outer holding lip 22 and is set to be longer than outer holding lip 22. Thus, in a case where the plate thickness of flange 3 is thin as shown in FIG. 3, at first, outer holding lips 22 which are relatively thin and short are bending deformed taking a priority so as to be held in the positioning state in which outer holding lips 22, 22 are contacted on projection sections 23, 23. That is to say, welt section 11 can be positioned and held at an appropriate position irrespective of the plate thickness of flange 3.

Figure 5:
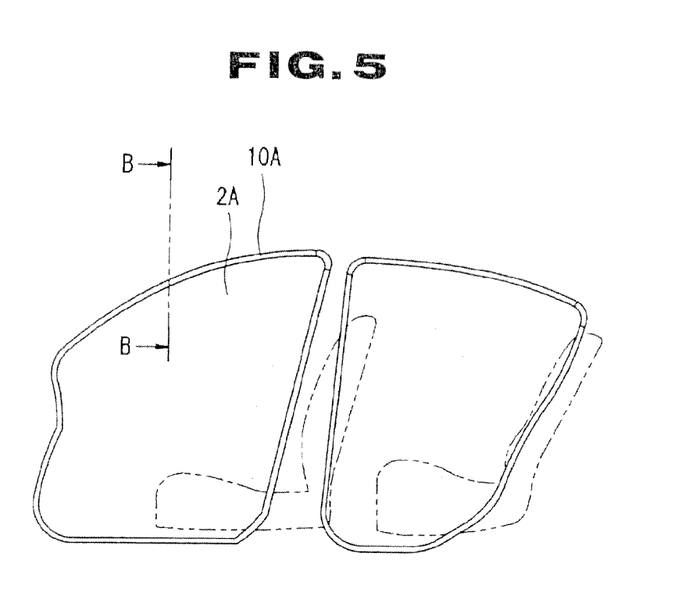
FIG. 5 is an explanatory view representing a door opening section of the automotive vehicle on which the weatherstrip related to a second preferred embodiment according to the present invention is mounted.
Figure 6:
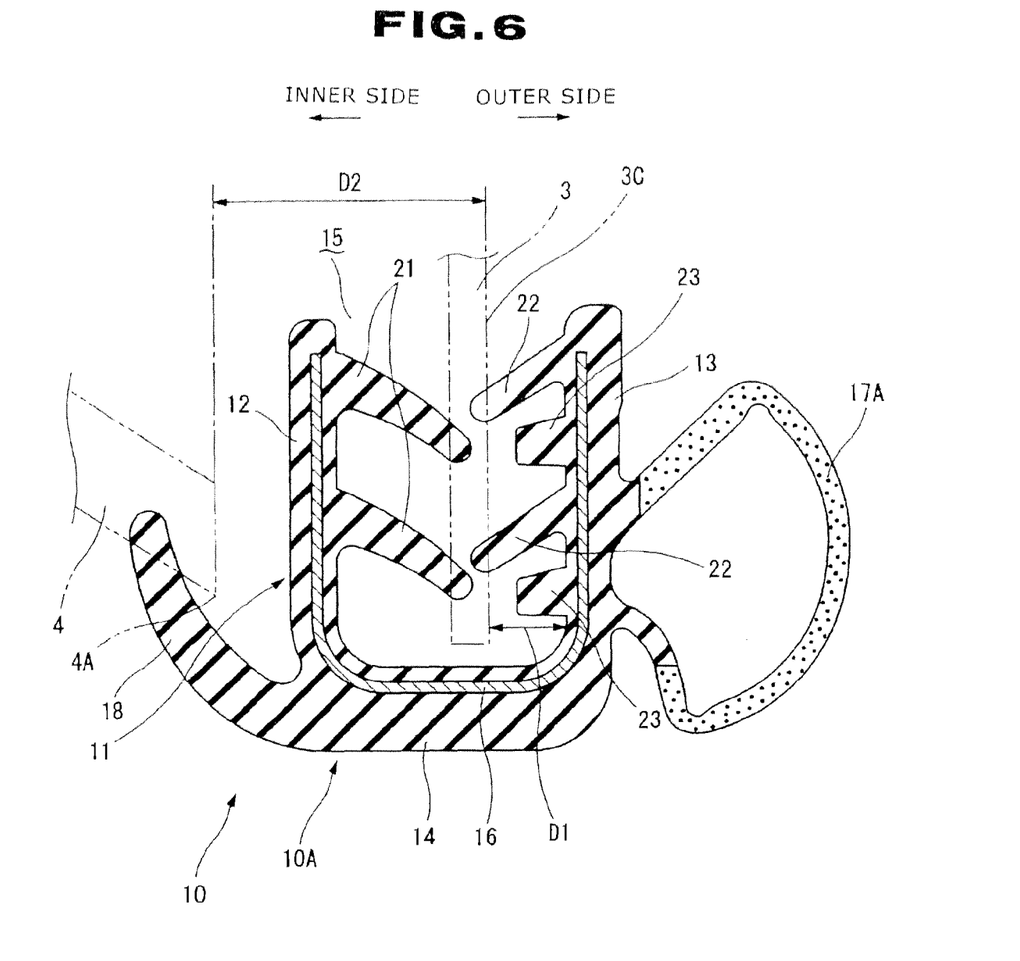
FIG. 6 is a cross sectional view representing a state of the free length of the weatherstrip along a line B-B of FIG. 5.

FIGS. 5 and 6 show a second preferred embodiment according to the present invention.

It should be noted that parts common to the first embodiment designate like elements of the second embodiment so that a duplicate explanation will, herein, be omitted. Weatherstrip 10A related to the second embodiment is mounted in a closed loop shape on a peripheral edge of a door opening section 2A which is open or closed by means of a door located at a vehicular door of the automotive vehicle.

As shown in FIG. 6, this weatherstip 10A is additionally formed on a side of the outer side wall section so that hollow seal section 17A is elastically contacted on an outer peripheral section of a door (not shown) when the door is closed. In this respect, the difference is present from the first embodiment.

The other structures are substantially the same as the first embodiment.

That is to say, projection sections 23, 23 are projected from back sides of outer holding lips 22, 22. When welt section 11 is fitted to flange 3, outer holding lips 22 are struck on projection sections 23 and positioned and held. In this way, in weatherstrip 10A in the second embodiment mounted in door opening section 2A, the holding force of welt section 11 is sufficiently secured against flange 3 by means of holding lips 21, 22 in the same way as the above-described first embodiment and welt section 11 with respect to the outer side surface 3C can be held at the same position by means of projection section irrespective of the plate thickness of flange 3. The bending margin of trim lip 18 can be equalized and the outer appearance can be improved.

The present invention have been explained on a basis of specific embodiments. However, the present invention is not limited to the preferred embodiments and the various changes and modifications are included. For example, the holding lips are two in the respective side wall sections in the above-described first and second embodiments, the holding lips may be single or three or more and the number of holding lips may be different in each of side wall sections.

EXPLANATION OF SIGNS

1 . . . trunk (opening/closing body)
2 . . . trunk opening section (opening section at the vehicular body side)
2A . . . door opening section (vehicular body side section)
3 . . . flange
4 . . . vehicular body trim
10, 10A . . . weatherstrip
11 . . . welt section
12 . . . inner side wall section
13 . . . outer side wall section
17, 17A . . . hollow seal section
18 . . . trim lip
21 . . . inner holding lip
22 . . . outer holding lip
23 . . . projection section

The invention claimed is:

1. A weatherstrip for an automotive vehicle, comprising:
a welt section attached onto a flange, the flange being mounted on a peripheral edge section of a vehicular body side opening section, having a substantially U-shaped cross-section, and having a pair of side wall sections facing each other with the flange grasped between the pair of side wall sections and mutually connected to each other via a summit section;
a trim lip formed on an outer surface of an inner side wall section of the pair of side wall sections which is near the vehicular body side opening section to cover an end edge of a vehicular body trim;
two pairs of holding lips, each of the pairs of holding lips being extended obliquely toward the summit section from a corresponding one of inner surfaces of the pair of side wall sections and elastically contacted on the flange such that each of the pairs of holding lips are bent and deformed to hold the welt section to the flange; and
a pair of projection sections, each of the projection sections projecting in an orthogonal direction from an inner surface of an outer side wall section of the pair of side wall sections, the inner surface of the outer side wall section being remote from the vehicular body side opening section, to an upper surface of a corresponding holding lip of one of the pairs of holding lips extending from the inner surface of the outer side wall section of the pair of side wall sections and contacting a tip of the corresponding holding lip of one of the pairs of holding lips extending from the inner surface of the outer side wall section when the tips of the holding lips of the pair of holding lips extending from the inner surface of the outer side wall section are bent and deformed toward the outer side wall section,
wherein a distance between an outer side surface of the flange, which is remote from the vehicular body side opening section, and the end edge of the vehicular body trim is constant along an elongate direction of the flange,
wherein the tips of the holding lips of the pair of holding lips extending from the inner surface of the outer side wall section of the pair of side wall sections and the pair of projection sections always contact each other when the welt section is attached onto the flange regardless of a thickness of the flange.

2. The weatherstrip for the automotive vehicle as claimed in claim 1, wherein a thickness of each of the holding lips of the inner side wall section is thicker than the thickness of each of the holding lips of the outer side wall section.

3. The weatherstrip for the automotive vehicle as claimed in claim 1, which further comprises a hollow seal section formed on an outer surface of the summit section and elastically contacted on a peripheral edge section of an opening or closing body which opens or closes the vehicular body side opening section when the opening or closing body is closed.

4. The weatherstrip for the automotive vehicle as claimed in claim 1, wherein the flange has a varying thickness along the elongate direction of the flange.

* * * * *